(12) United States Patent
Yamazaki et al.

(10) Patent No.: US 8,398,927 B2
(45) Date of Patent: Mar. 19, 2013

(54) CARBON NANOTUBE MANUFACTURING APPARATUS, CARBON NANOTUBE MANUFACTURING METHOD, AND RADICAL PRODUCING APPARATUS

(75) Inventors: Yuichi Yamazaki, Tokyo (JP); Tadashi Sakai, Kanagawa (JP); Naoshi Sakuma, Kanagawa (JP); Masayuki Katagiri, Kanagawa (JP); Mariko Suzuki, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 324 days.

(21) Appl. No.: 12/495,004

(22) Filed: Jun. 30, 2009

(65) Prior Publication Data
US 2010/0072054 A1 Mar. 25, 2010

(30) Foreign Application Priority Data
Jun. 30, 2008 (JP) ................. 2008-171578

(51) Int. Cl.
*B01J 19/08* (2006.01)
(52) U.S. Cl. .................................. 422/186.04
(58) Field of Classification Search .............. 422/186.04
See application file for complete search history.

(56) References Cited

FOREIGN PATENT DOCUMENTS

| JP | 2003-147533 | 5/2003 |
| JP | 2005-350342 | 12/2005 |
| JP | 2008-38164 | 2/2008 |
| JP | 2008-038164 | * 2/2008 |
| JP | 2008-44828 | 2/2008 |
| JP | 2008-75122 | 4/2008 |

OTHER PUBLICATIONS

Masayuki Katagiri, et al., "Carbon Nanotube Vias Fabricated by Remote Plasma-Enhanced Chemical Vapor Deposition" Japanese Journal of Applied Physics, vol. 47, No. 4, 2008 pp. 2024-2027.

* cited by examiner

*Primary Examiner* — Kishor Mayekar
(74) *Attorney, Agent, or Firm* — Oblon, Spivak, McClelland, Maier & Neustadt, L.L.P.

(57) ABSTRACT

A carbon nanotube manufacturing apparatus includes a plasma generating unit that generates plasma including ions, radicals, and electrons, from gas; a carbon nanotube manufacturing unit that manufactures carbon nanotubes from the radicals; a shielding electrode unit that is provided between the plasma generating unit and the carbon nanotube manufacturing unit and prevents the ions and the electrons from entering the carbon nanotube manufacturing unit; and a bias applying unit that applies a voltage to the shielding electrode unit, wherein the shielding electrode unit includes at least two first shielding electrodes that are arranged one above another, each of the first shielding electrodes having at least one opening.

7 Claims, 9 Drawing Sheets

CHARGED-PARTICLE
SHIELDING ELECTRODE UNIT

BOX-SHAPED SHIELDING
ELECTRODE UNIT

CARBON NANOTUBE MANUFACTURING APPARATUS, CARBON NANOTUBE MANUFACTURING METHOD, AND RADICAL PRODUCING APPARATUS

CROSS-REFERENCE TO RELATED APPLICATIONS

This application is based upon and claims the benefit of priority from the prior Japanese Patent Application No. 2008-171578, filed on Jun. 30, 2008; the entire contents of which are incorporated herein by reference.

BACKGROUND OF THE INVENTION

1. Field of the Invention

The present invention relates to a carbon nanotube manufacturing apparatus, a carbon nanotube manufacturing method, and a radical producing apparatus.

2. Description of the Related Art

Carbon nanotubes have been attracting attention as a new material that has many superior characteristics derived from the special structure thereof. Examples of carbon nanotube manufacturing methods include arc discharge methods, laser ablation methods, and liquid phase methods. Of various carbon nanotube manufacturing methods, Chemical Vapor Deposition (CVD) methods are excellent in terms of productivity, controllability, and semiconductor process compatibility. Among CVD methods, for plasma CVD methods by which carbon nanotubes are manufactured by decomposing raw materials with plasma, a large number of manufacturing method examples that employ various plasma generating methods have been proposed. Examples of excitation methods include capacitive coupling plasma, inductive coupling plasma, and surface wave plasma.

For example, a technical document by N. Sakuma et al., in the Proceedings of the International Conference on New Diamond and Nano Carbons 2007, page 195, describes findings as a result of a study on growth of high-quality carbon nanotubes at a low temperature while a plasma CVD method is employed. According to the findings, to manufacture high-quality carbon nanotubes at a low temperature by using plasma, it is essential to selectively eliminate ion components because the ion components may cause etching in the carbon nanotubes.

It is possible to reduce the ion components relatively easily by lowering the plasma power or increasing the pressure; however, this solution would, at the same time, also reduce radical components, which are a raw material of carbon nanotubes. As another example, according to a commonly-used remote plasma method by which a substrate is positioned sufficiently distant from plasma, the quantity of radicals decreases like in the example where the pressure is increased. In addition, in the case where the life span of the ions is longer than the life span of the radicals, it becomes impossible to generate carbon nanotubes because the quantity of radicals being supplied is too small.

As a method for actively eliminating only the ion components, it has been proposed that, in combination with a remote plasma method, a mesh grid to which a bias can be applied is provided between plasma and a substrate so as to prevent the ion components from reaching the substrate. Because ions are positively charged normally, it is possible to eliminate only the ion components easily by applying a positive bias. In this situation, however, electrons that have the opposite electric charges (or negative ions may have been generated in some cases, depending on the type of gas being used) are accelerated by the positive bias and go through the mesh grid. In many situations, the bias that is applied for the purpose of eliminating the ion components is at a level of tens of volts or higher. Thus, the electrons that have gone through the mesh grid have a kinetic energy of tens of electron volts or higher. Because this kinetic energy is high enough to decompose and excite the gas, ions and radicals are re-generated between the mesh grid and the substrate. For this reason, in an experiment using a mesh grid to which a positive bias was applied, it was possible to obtain only low-quality carbon nanotubes in which the graphene wall was shaped in a "cup stack" form. In other words, by simply configuring the apparatus so that a positive bias is applied to the mesh grid, it is difficult to manufacture high-quality carbon nanotubes, although it is possible to eliminate the ion components.

Further, a method for eliminating the ion components by using a magnetic field has also been proposed. However, according to this method, substances that have the opposite electric charges are collected, like in the example of the electric method where the bias is applied. In addition, according to this method where a magnetic field is used, energy is given to both the ions and the electrons. Thus, it is more difficult to completely eliminate the ion components, because the gas is decomposed and excited by those ions and electrons in a more enhanced manner.

As explained above, the conventional techniques focus only on elimination of the ion components and take no countermeasures for particles having the opposite electric charges. As it is apparent from the result of the experiment described above, to have high-quality carbon nanotubes grow at a low temperature, it is important to address the issue of the particles having the opposite electric charges as well as to eliminate the ion components. Further, it is necessary to ensure that the radicals, which are required for the growth of the carbon nanotubes, will not be lost while the issue is addressed. Consequently, a plasma apparatus that is capable of supplying only radical components is in demand.

SUMMARY OF THE INVENTION

According to one aspect of the present invention, a carbon nanotube manufacturing apparatus includes a plasma generating unit that generates plasma including ions, radicals, and electrons, from gas; a carbon nanotube manufacturing unit that manufactures carbon nanotubes from the radicals; a shielding electrode unit that is provided between the plasma generating unit and the carbon nanotube manufacturing unit and prevents the ions and the electrons from entering the carbon nanotube manufacturing unit; and a bias applying unit that applies a voltage to the shielding electrode unit, wherein the shielding electrode unit includes at least two first shielding electrodes that are arranged one above another, each of the first shielding electrodes having at least one opening.

According to another aspect of the present invention, a carbon nanotube manufacturing method includes generating plasma including ions, radicals, and electrons, from gas; applying a voltage to a shielding electrode unit that includes at least two shielding electrodes that are arranged one above another, each of the shielding electrodes having at least one opening; preventing the ions and the electrons from entering a carbon nanotube manufacturing unit that manufactures carbon nanotubes from the radicals, and allowing the radicals to enter the carbon nanotube manufacturing unit; and manufacturing the carbon nanotubes from the radicals.

According to still another aspect of the present invention, a radical producing apparatus includes a plasma generating unit that generates plasma including ions, radicals, and electrons, from gas; a shielding electrode unit that prevents the ions and the electrons from being released to outside thereof and releases the radicals to the outside thereof; and a bias applying unit that applies a voltage to the shielding electrode unit, wherein the shielding electrode unit includes at least two shielding electrodes that are arranged one above another, each of the shielding electrodes having at least one opening.

DETAILED DESCRIPTION OF THE INVENTION

Exemplary embodiments of a carbon nanotube manufacturing apparatus, a carbon nanotube manufacturing method, and a radical producing apparatus according to the present invention will be explained in detail, with reference to the accompanying drawings.

Figure 1:
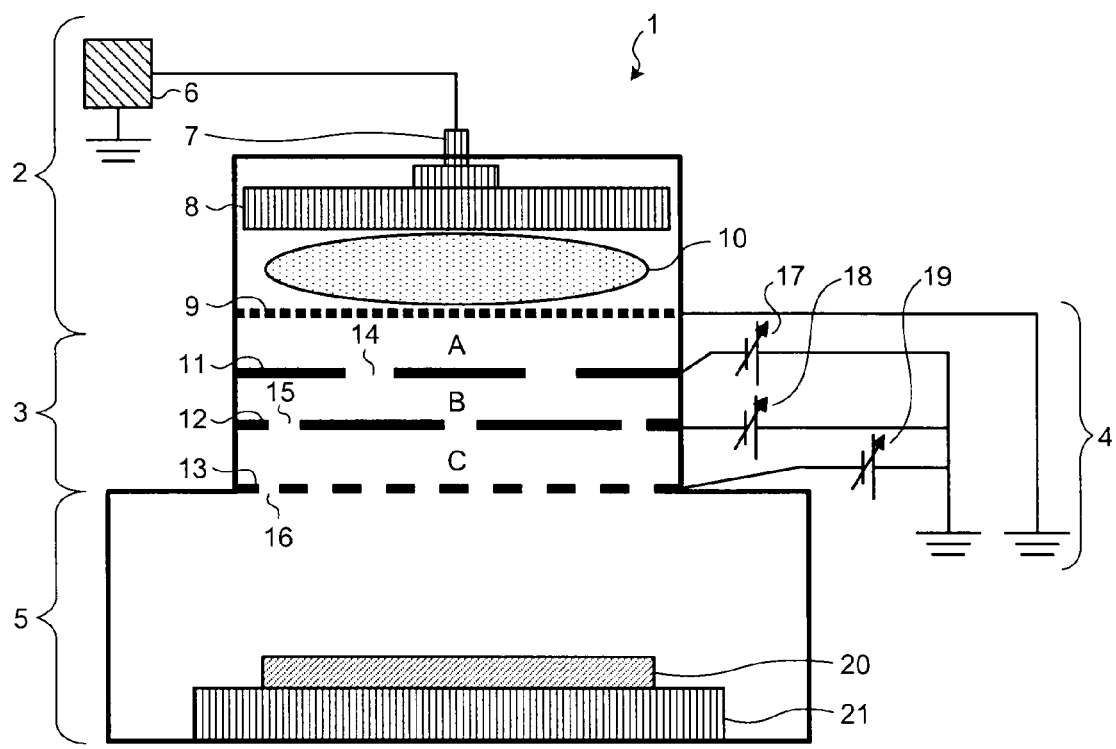
FIG. 1 is a cross-sectional view of a carbon nanotube manufacturing apparatus according to a first embodiment of the present invention.

As shown in FIG. 1, a carbon nanotube manufacturing apparatus 1 manufactures carbon nanotubes on a substrate by using a plasma CVD method. The carbon nanotube manufacturing apparatus 1 includes a plasma generating unit 2, a multi-level charged-particle shielding-electrode unit 3, a bias applying power source 4, and a growth substrate holding unit 5.

The plasma generating unit 2 generates plasma. The plasma generating unit 2 includes a pulse power source 6, a gas inlet 7, an upper electrode 8, and a lower electrode 9.

The pulse power source 6 generates a pulse voltage used in the generation of the plasma. Because the plasma is intermittently generated when the pulse is high at peak values, the electric power that is required by the pulse power source 6 for the generation of the plasma is lower than electric powers required by other types of power sources.

The gas inlet 7 is used for introducing discharge gas into the carbon nanotube manufacturing apparatus 1. For example, the discharge gas may be a mixed gas in which the following are mixed together in an appropriate proportion: methane serving as a carbon-based gas that is a raw material of carbon nanotubes; hydrogen serving as a carrier gas; and argon serving as a noble gas that has an excitation accelerating effect. In this situation, to obtain the excitation accelerating effect of excited noble gas atoms exhibited on other atoms and molecules, it is preferable to configure the ratio of the argon gas so as to be 50% or higher. Also, because hydrogen ions are one of the factors that inhibit the growth of the carbon nanotubes, it is desirable to configure the methane-to-hydrogen ratio so as to be 1 or higher. The types of gases to be used are not limited to these examples. It is acceptable to use acetylene as the carbon-based gas, and helium as the noble gas.

The upper electrode 8 is configured so that the pulse voltage from the pulse power source 6 is applied between the upper electrode 8 and the lower electrode 9 and so that the discharge gas introduced through the gas inlet 7 is released from the upper electrode 8. The upper electrode 8 has a large number of holes (not shown) that are connected to the gas inlet 7, so that the discharge gas from the gas inlet 7 is evenly released from the entire area of the upper electrode 8. Plasma 10 is generated from the discharge gas in the space between the upper electrode 8 and the lower electrode 9. The plasma 10 includes various types of ions that have electric charges, radicals that are electrically neutral but are highly reactive, and electrons that are dissociated from atoms.

The lower electrode 9 is configured so that the pulse voltage is applied between the lower electrode 9 and the upper electrode 8. The lower electrode 9 is configured so as to be in the form of a mesh (i.e., a grid). The generated plasma 10 (i.e., the ions, the radicals, and the electrons) is forwarded to the multi-level charged-particle shielding-electrode unit 3 through holes (i.e., openings) in the mesh. The lower electrode 9 is normally connected to ground; however, another arrangement is acceptable in which a positive or negative Direct Current (DC) potential is applied to the lower electrode 9 so that the state of the plasma 10 can be controlled.

Of the ions, the radicals, and the electrons that are included in the plasma 10, to block the ions and the electrons, the multi-level charged-particle shielding-electrode unit 3 is provided between the plasma generating unit 2 and the growth substrate holding unit 5. The multi-level charged-particle shielding-electrode unit 3 includes three plate-like shielding electrode units that are arranged one above another. More specifically, the multi-level charged-particle shielding-electrode unit 3 includes a first shielding electrode unit 11 positioned on the first level, a second shielding electrode unit 12 positioned on the second level, and a third shielding electrode unit 13 positioned on the third level. The first shielding electrode unit 11 has a plurality of openings 14, whereas the second shielding electrode unit 12 has a plurality of openings 15, and the third shielding electrode unit 13 has a plurality of openings 16.

Figure 2:
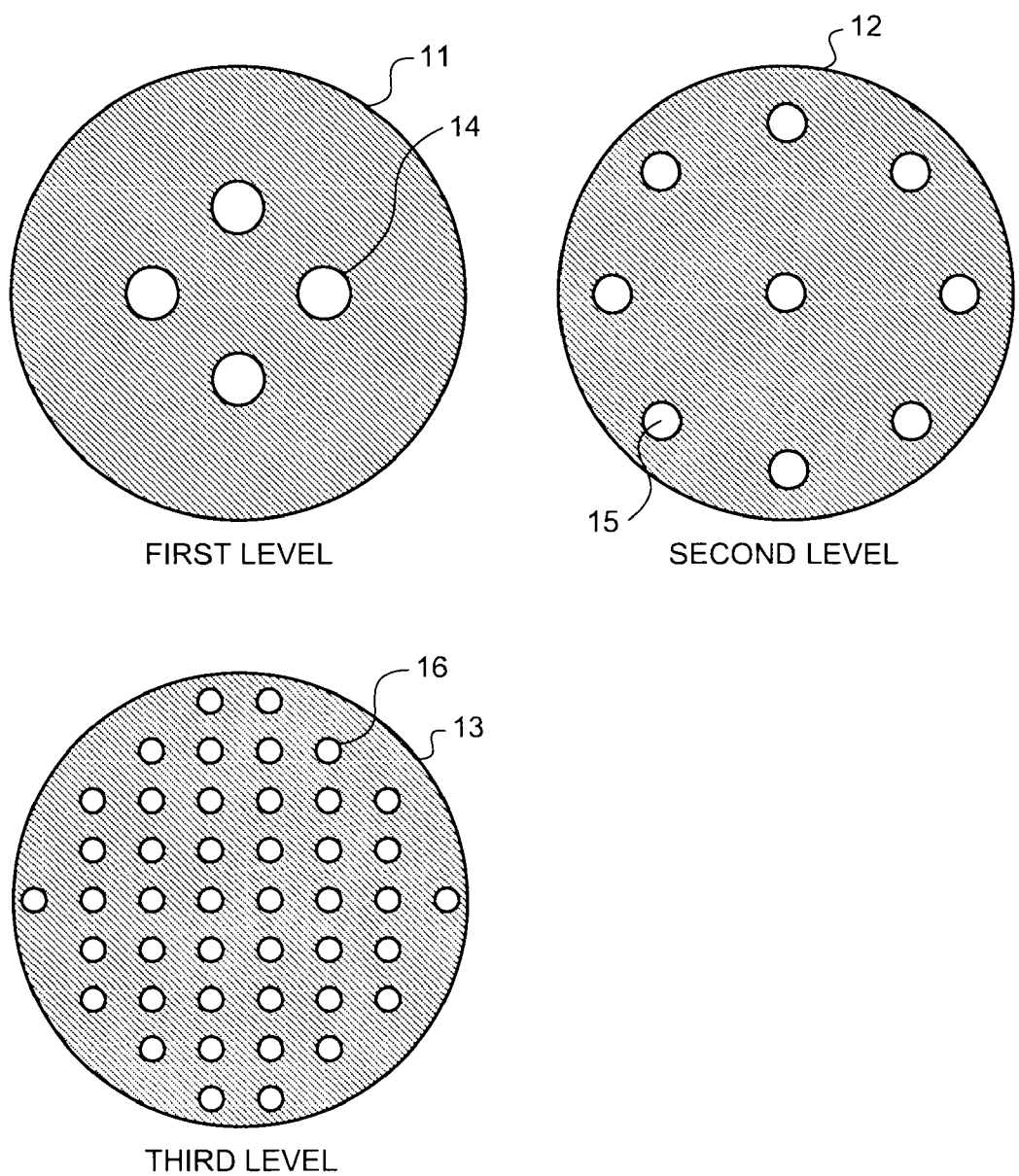
FIG. 2 is a top view of shielding electrode units included in a multi-level charged-particle shielding-electrode unit.

As shown in FIG. 2, the opening diameters of the openings 14, 15, and 16 are configured in such a manner that the opening diameter of each of the openings 15 is smaller than the opening diameter of each of the openings 14, and also that the opening diameter of each of the openings 16 is smaller than the opening diameter of each of the openings 15. Further, the number of openings 15 is larger than the number of openings 14, and also, the number of openings 16 is larger than the number of openings 15. The details of the mechanism of the multi-level charged-particle shielding-electrode unit 3 will be explained later.

The bias applying power source 4 is a power source that applies a bias to the multi-level charged-particle shielding-electrode unit 3. In the present example, the bias applying power source 4 applies a negative bias to the multi-level charged-particle shielding-electrode unit 3. The bias applying power source 4 includes a first-bias applying power source 17, a second-bias applying power source 18, and a third-bias applying power source 19.

The first-bias applying power source 17 is connected to the first shielding electrode unit 11 and applies a voltage to the first shielding electrode unit 11. The second-bias applying power source 18 is connected to the second shielding electrode unit 12 and applies a voltage to the second shielding electrode unit 12. The third-bias applying power source 19 is connected to the third shielding electrode unit 13 and applies a voltage to the third shielding electrode unit 13. Thus, it is possible to apply mutually different voltages to the first shielding electrode unit 11, the second shielding electrode unit 12, and the third shielding electrode unit 13, respectively. It is preferable to specify each of the voltages applied by the first-bias applying power source 17, the second-bias applying power source 18, and the third-bias applying power source 19 so as to be within a range between a maximum of hundreds of volts and a minimum of a few or several volts.

The growth substrate holding unit 5 manufactures carbon nanotubes by having carbon nanotubes formed on a surface of a substrate 20 by using a vapor phase growing method. The growth substrate holding unit 5 includes a substrate stage 21. The substrate stage 21 is a stage on which the substrate 20 is placed. The substrate stage 21 includes a heating mechanism (not shown) and is capable of heating the substrate 20 to an appropriate temperature. The substrate 20 can be made of any suitable material such as silicon (Si). The substrate 20 has fine particles (or an extremely thin film) of nickel (Ni), iron (Fe), and/or cobalt (Co), which serve as a catalyst, deposited thereon. The substrate 20 is heated to a low temperature within a wide range between, for example, 300° C. and 500° C.

<A Method for Manufacturing Carbon Nanotubes>

A method for manufacturing carbon nanotubes that is used by the carbon nanotube manufacturing apparatus 1 according to a first embodiment of the present invention will be explained. In the following explanation with reference to FIG. 2, the space between the lower electrode 9 and the first shielding electrode unit 11 will be referred to as a space A, whereas the space between the first shielding electrode unit 11 and the second shielding electrode unit 12 will be referred to as a space B, and the space between the second shielding electrode unit 12 and the third shielding electrode unit 13 will be referred to as a space C.

First, when a pulse voltage from the pulse power source 6 is applied to the upper electrode 8, so that the discharge gas is released through the large number of holes provided in the upper electrode 8, the plasma 10 is generated between the upper electrode 8 and the lower electrode 9. As explained above, the electric power that is required by the pulse power source 6 for the generation of the plasma is lower than electric powers required by other types of power sources. In addition, the reason why the pulse power source 6 is used as the power source can be explained as follows: Generally speaking, the quantities of the ions, the radicals, and the electrons that are included in plasma are proportional to the electric power that is input. Thus, to keep the quantities of the ions and the electrons small, it is effective to generate and maintain plasma with a low electric power. For this reason, the pulse excitation method is used for generating the plasma, and the density of the generated plasma is $10^{10}$ cm$^{-3}$ or lower.

The plasma 10 that has been generated is forwarded into the space A within the multi-level charged-particle shielding-electrode unit 3 through the holes (i.e., the openings) in the mesh of the lower electrode 9, while following a flow of the exhaust from an exhaust unit (not shown) provided in the carbon nanotube manufacturing apparatus 1 or a flow due to the gravity. Also, in the space A, ions and radicals are secondarily generated due to the excitation accelerating effect of the excited argon atoms that have been generated in the plasma 10. In the present example, a negative bias is applied to each of the shielding electrode units included in the multi-level charged-particle shielding-electrode unit 3 by the bias applying power source 4.

As a result, because the first shielding electrode unit 11 functions as an absorbing plate for the ions, a large part of the ions that are present in the space A are attracted to the first shielding electrode unit 11 due to an attractive force thereof and vanish when colliding with the first shielding electrode unit 11. However, a small quantity of ions are accelerated by the negative bias, go through the openings 14, and reach the space B.

Also, because the first shielding electrode unit 11 functions as a reflecting plate for the electrons, the electrons that are present in the space A are confined to the space A due to a repulsion force of the first shielding electrode unit 11. As for the radicals in the space A, because the radicals are electrically neutral and are not influenced by the negative bias applied to the first shielding electrode unit 11, the radicals go through the openings 14 and reach the space B while following the flow. As a result, almost all the radicals and the small quantity of ions reach the space B from the space A.

In the space B, in addition to the radicals and the small quantity of ions that have moved from the space A, more ions and radicals are secondarily generated due to the excitation accelerating effect of the excited argon atoms that have been generated in the plasma 10. Further, a small quantity of ions and a small quantity of electrons are newly generated because of decomposition and excitation of the discharge gas that are caused by the ions accelerated in the space B.

Figure 3:
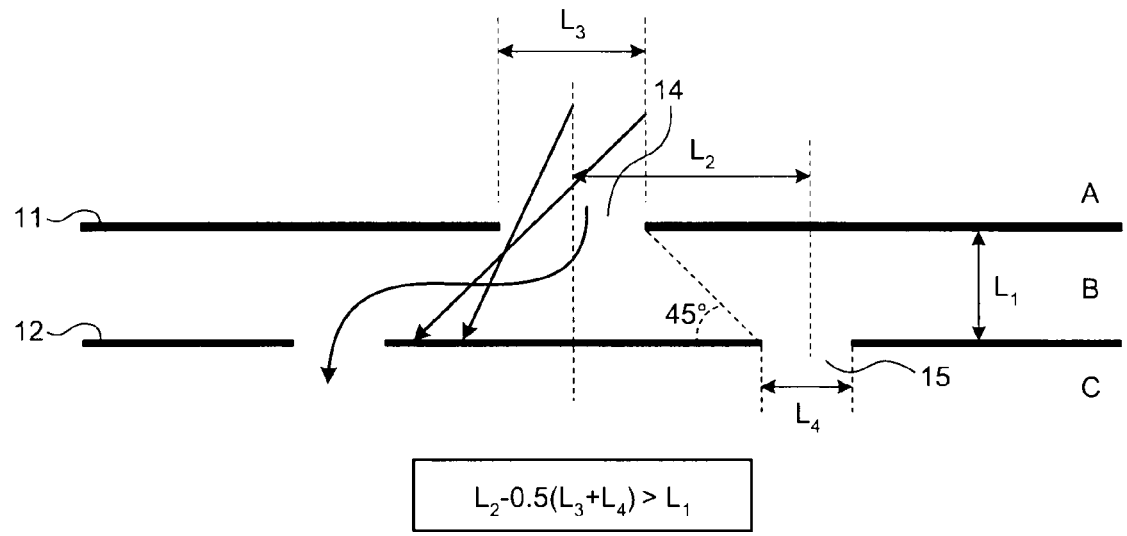
FIG. 3 is a drawing for explaining a relationship between openings in the shielding electrode units and the shielding electrode units.

Further, because the second shielding electrode unit 12 functions as an absorbing plate for the ions, the small quantity of ions that are present in the space B are attracted to the second shielding electrode unit 12 due to an attractive force thereof, so that almost all of the small quantity of ions vanish when colliding with the second shielding electrode unit 12. At this time, to prevent the situation where the ions accelerated by the negative bias go through the openings 15 without colliding with the second shielding electrode unit 12, the openings 15 are configured so as to be positioned distant from the openings 14 by a predetermined length. The relationships between the openings in the shielding electrode units and the shielding electrode units are shown in FIG. 3. Because the ions that have been accelerated in the space A are further accelerated in the space B, the ions move linearly in the space B. Thus, the openings 15 are configured so as to be positioned distant from the openings 14 so as to prevent the ions that have moved from the space A into the space B and have become incident at an angle of incidence of 45 degrees or larger from going through the openings 15.

Accordingly, it is possible to cause the ions that are present in the space B to vanish due to the collisions with the second shielding electrode unit 12 by designing the openings so that Expression (1) shown below is satisfied, where the distance between the first shielding electrode unit 11 and the second shielding electrode unit 12 is expressed as L1, the distance between the centers of the opening 14 and the opening 15 is expressed as L2, the opening diameter of each of the openings 14 is expressed as L3, and the opening diameter of each of the openings 15 is expressed as L4:

$$L_2 - 0.5 \times (L_3 + L_4) > L_1 \qquad (1)$$

In actuality, the electric field that is formed by the multi-level charged-particle shielding-electrode unit 3 is substantially uniform. Thus, even if the shielding electrode units were designed on the assumption that the angle of incidence is larger than 45 degrees, the ions would hardly go through the openings 15. Consequently, in actuality, as long as Expression (1) above is satisfied, it is possible to design the openings 14 and the opening 15 so as to have any configuration. It should be noted, however, that the longer the distance L2 between the centers of the opening 14 and the opening 15 is, the higher is the radicals-to-ions ratio in the space C, and the smaller is the quantity of radicals that reach the space C, because the number of openings 14 and the number of openings 15 need to be smaller due to the design.

For the reasons explained above, almost all of the ions in the space B vanish. Also, because the second shielding electrode unit 12 functions as a reflecting plate for the electrons, the electrons that are present in the space B are confined to the space B due to a repulsion force of the second shielding electrode unit 12. As for the radicals in the space B, because the radicals are electrically neutral and are not influenced by the negative bias applied to the second shielding electrode unit 12, the radicals go through the openings 15 and reach the space C while following the flow.

In the space C, in addition to the radicals that have moved from the space B, ions and more radicals are secondarily generated due to the excitation accelerating effect of the excited argon atoms that have been generated in the plasma 10.

Because the large number of openings 16 are provided in the third shielding electrode unit 13, Expression (1) shown above does not apply to the design of the positions of the openings 16; however, it is possible to cause a predetermined quantity of the ions that are present in the space C to vanish due to collisions with the third shielding electrode unit 13 and to confine the electrons that are present in the space C to the space C by using the third shielding electrode unit 13. Accordingly, as for the third shielding electrode unit 13 positioned on the third level, it is more realistic to assume the angle of incidence of the ions to be an angle larger than 45 degrees (i.e., to configure the intervals between the openings so as to be shorter) because it is possible to supply a sufficient quantity of radicals to the growth substrate holding unit 5 by a shower effect.

Because of the third shielding electrode unit 13, the ions in the space C vanish, and the electrons that are present in the space C are confined to the space C. However, because the radicals that are present in the space C are electrically neutral and are not influenced by the negative bias applied to the third shielding electrode unit 13, the radicals go through the openings 16 and reach the growth substrate holding unit 5 while following the flow.

In the present example, the openings 14, 15, and 16 are configured so that the opening diameters thereof become smaller and the distribution density thereof becomes higher, from the upper level to the lower level. Thus, it is possible to obtain a uniform radical flow in the growth substrate holding unit 5. By using the radicals that have reached the growth substrate holding unit 5 as a raw material, it is possible to manufacture carbon nanotubes on the surface of the substrate 20.

The plasma generating unit 2 and the growth substrate holding unit 5 are separated from each other by the multi-level charged-particle shielding-electrode unit 3. The pressure in the growth substrate holding unit 5 is lower than the pressure in the plasma generating unit 2. By regulating the pressure in the plasma generating unit 2, it is possible to keep the decrease in the quantity of radical components within the growth substrate holding unit 5 minimum, the decrease being caused by the collisions of the radical components with the discharge gas.

Also, as explained above, the bias voltage applied to the multi-level charged-particle shielding-electrode unit 3 is configured so as to be within a range between a maximum of hundreds of volts and a minimum of a few or several volts. The values of the voltages that are applied to the shielding electrode units are configured so that the voltage applied to the second shielding electrode unit 12 is lower than the voltage applied to the first shielding electrode unit 11 and so that the voltage applied to the third shielding electrode unit 13 is lower than the voltage applied to the second shielding electrode unit 12. The reason is that, by gradually lowering the applied bias from the first level to the third level, it is possible to keep the decomposition and the excitation of the gas caused by the ions and the electrons at a minimum level, because the energy that is given to the ions or the electrons due to the biases gradually becomes smaller. As explained here, it is possible to achieve a high level of efficiency for eliminating the ions and the electrons by designing the shielding electrode units included in the multi-level charged-particle shielding-electrode unit 3 so as to have a multi-level structure.

Further, because the multi-level charged-particle shielding-electrode unit 3 includes the plurality of shielding electrode units (i.e., the shielding electrode units 11, 12, and 13) and because the traveling distance of the radicals to reach the growth substrate holding unit 5 is long due to the positional arrangement where the openings 14 and the openings 15 are positioned distant from each other, a problem remains where the quantity of radicals, which are required for the generation of the carbon nanotubes, decreases because of the radicals' collisions with the discharge gas or the like. However, with the excitation acceleration effect of the excited argon atoms that have been generated in the plasma 10, it is possible to secondarily generate ions and radicals and to replenish radicals the quantity of which has decreased. Because the excited argon atoms are in a metastable state and have an extremely long life span, it is possible to generate ions, radicals, and electrons with a high level of efficiency, also in the multi-level charged-particle shielding-electrode unit 3. Further, because the ions and the electrons that are generated at the same time with the radicals are eliminated or captured by the shielding electrode units 11, 12, and 13, the ions and the electrons do not move to the next space underneath. Consequently, it is possible to supply a sufficient quantity of radicals to the growth substrate holding unit 5.

As explained above, it is possible to realize both the elimination of the ion components and the electrons and the supply of the required quantity of pure radical components, by regulating the configurations and the distributions of the openings provided in the shielding electrode units 11, 12, and 13 included in the multi-level charged-particle shielding-electrode unit 3, the distances between the shielding electrode units 11, 12, and 13, the voltages applied to the shielding electrode units 11, 12, and 13, and the pressures in the plasma generating unit 2 and the growth substrate holding unit 5. Consequently, it is possible to manufacture high-quality carbon nanotubes in a wide range of temperatures, especially at a low temperature. As a result, it is possible to manufacture carbon nanotubes on a material of which the heat resistance temperature is low. The carbon nanotubes are therefore expected to be used in a wide range of applications.

According to the first embodiment, the bias applying power source 4 applies the negative bias to the multi-level charged-particle shielding-electrode unit 3; however, it is possible to eliminate the ions and the electrons even if the bias applying power source 4 applies a positive bias. In this situation, the first shielding electrode unit 11, the second shielding electrode unit 12, and the third shielding electrode unit 13 each function as a reflecting plate for the ions and as an absorbing plate for the electrons. However, because the ions have a larger mass and thus have a higher tendency of travelling linearly and because the ions have a larger scattering cross-section area, it is preferable to apply a negative bias to the multi-level charged-particle shielding-electrode unit 3 and to have the ions drawn into the shielding electrode units.

Further, according to the first embodiment, the discharge gas is the mixed gas in which the carbon-based gas, hydrogen, and the noble gas are mixed together in an appropriate proportion. However, another arrangement is acceptable in which a mixed gas in which only a carbon-based gas and hydrogen are mixed together in an appropriate proportion is used. In this situation, it is not possible to re-generate radicals from the noble gas. However, there will be no problem if only a small quantity of radicals is required.

Next, a modification example of the carbon nanotube manufacturing apparatus according to the first embodiment will be explained. In the present modification example, only the configurations of the first shielding electrode unit and the third shielding electrode unit that are included in the multi-level charged-particle shielding-electrode unit 3 are different from those in the first embodiment.

Figure 4:
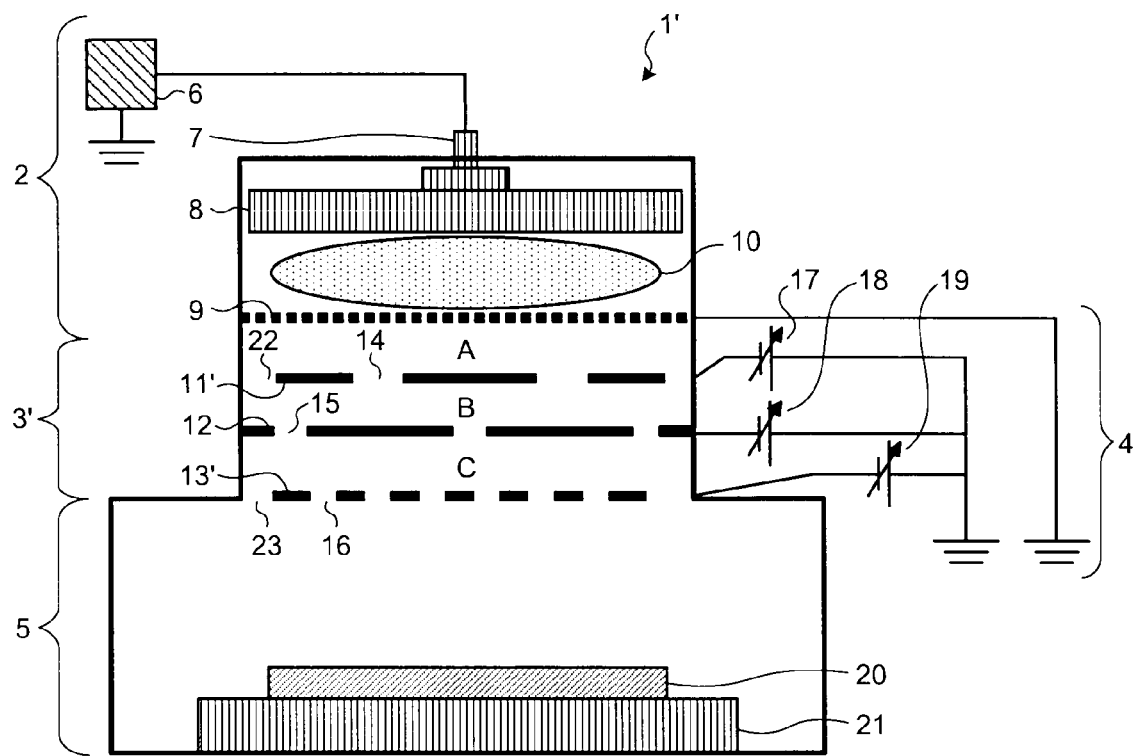
FIG. 4 is a cross-sectional view of a modification example of the carbon nanotube manufacturing apparatus according to the first embodiment.
Figure 5:
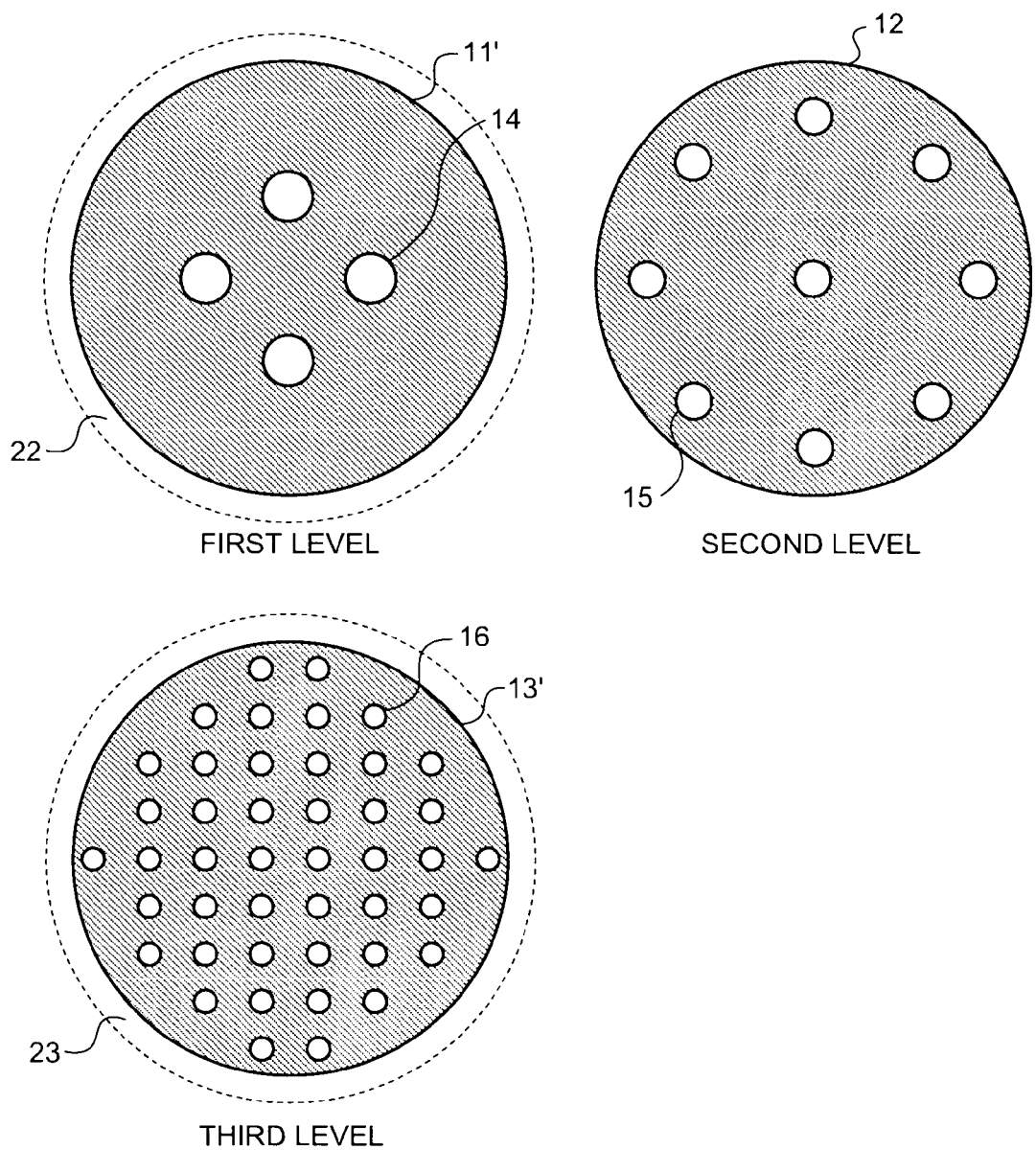
FIG. 5 is a top view of shielding electrode units included in another multi-level charged-particle shielding-electrode unit.

As shown in FIGS. 4 and 5, in a carbon nanotube manufacturing apparatus 1', a first shielding electrode unit 11' and a third shielding electrode unit 13' that are included in a multi-level charged-particle shielding-electrode unit 3' are each configured so as to be smaller than the size of the outer wall (shown with dotted lines in FIG. 5) of the multi-level charged-particle shielding-electrode unit 3'. As a result, a gap 22 is formed between the outer circumference of the first shielding electrode unit 11' and the outer wall of the multi-level charged-particle shielding-electrode unit 3', and also, a gap 23 is formed between the outer circumference of the third shielding electrode unit 13' and the outer wall of the multi-level charged-particle shielding-electrode unit 3'.

In this structure, even if the first shielding electrode unit 11' has the gap 22, it is possible to cause the ions in the space B to vanish due to collisions with the second shielding electrode unit 12, by positioning the gap 22 so as to be distant from the openings 15 so that the ions that have become incident in the space B do not go through the openings 15. In addition, it is possible to confine the electrons in the space B to the space B by using the second shielding electrode unit 12.

Further, even if the third shielding electrode unit 13' has the gap 23, it is possible to cause a predetermined quantity of the ions that are present in the space C to vanish due to collisions with the third shielding electrode unit 13' and to confine the electrons in the space C to the space C by using the third shielding electrode unit 13'. In addition, even if the third shielding electrode unit 13' has the gap 23, it is possible to obtain a uniform radical flow in the growth substrate holding unit 5.

As explained above, when the carbon nanotube manufacturing apparatus according to the first embodiment is used, the shielding electrode units that are respectively positioned on the three levels and are included in the charged-particle shielding electrode unit provided between the plasma generating unit and the growth substrate holding unit are able to prevent the ions and the electrons from entering the growth substrate holding unit and to allow the radicals to move into the growth substrate holding unit, the ions, the radicals, and the electrons being included in the plasma generated by the plasma generating unit. Thus, it is possible to manufacture high-quality carbon nanotubes by using the radicals as a raw material, in a wide range of temperatures, especially at a low temperature.

As a second embodiment of the present invention, a radical producing apparatus that includes the plasma generating unit, the multi-level charged-particle shielding-electrode unit, and the bias applying power source, among the constituent elements of the carbon nanotube manufacturing apparatus according to the first embodiment will be explained. In the following sections, the second embodiment will be explained with reference to the accompanying drawings. A configuration of the radical producing apparatus according to the second embodiment will be explained while a focus is placed on the differences from the first embodiment. Because the other parts of the second embodiment are the same as the first embodiment, as for the elements that are referred to by using the same characters, explanation thereof will be omitted, and the explanation above should be referred to.

Figure 6:
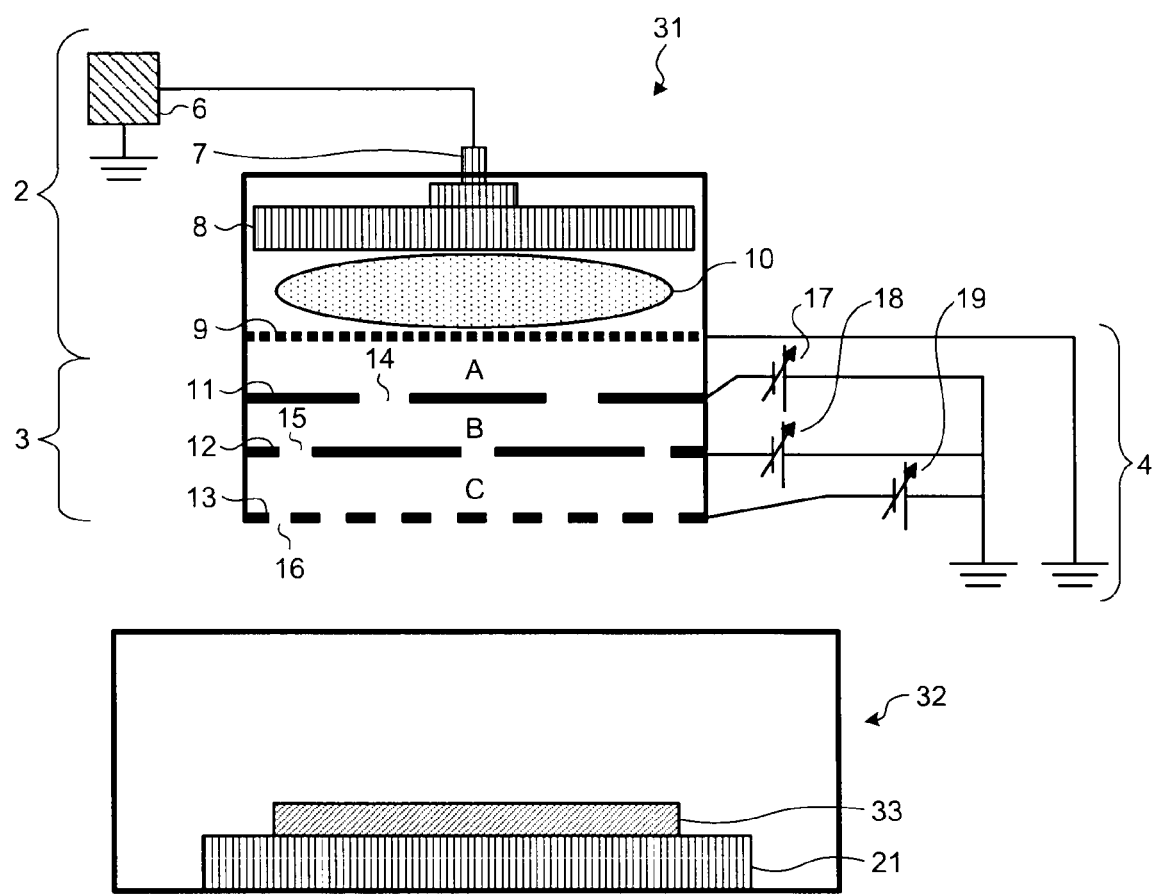
FIG. 6 is a cross-sectional view of a radical producing apparatus according to a second embodiment of the present invention.

As shown in FIG. 6, a radical producing apparatus 31 produces radicals. The radical producing apparatus 31 includes the plasma generating unit 2, the multi-level charged-particle shielding-electrode unit 3, and the bias applying power source 4. In other words, of the constituent elements of the carbon nanotube manufacturing apparatus 1 according to the first embodiment, the radical producing apparatus 31 includes the plasma generating unit 2, the multi-level charged-particle shielding-electrode unit 3, and the bias applying power source 4, but does not include the growth substrate holding unit 5.

The plasma generating unit 2 generates the plasma 10. The plasma generating unit 2 includes the pulse power source 6, the gas inlet 7, the upper electrode 8, and the lower electrode 9. Of the ions, the radicals, and the electrons that are included in the plasma 10, the multi-level charged-particle shielding-electrode unit 3 blocks the ions and the electrons. The multi-level charged-particle shielding-electrode unit 3 includes the first shielding electrode unit 11, the second shielding electrode unit 12, and the third shielding electrode unit 13. The first shielding electrode unit 11 has the plurality of openings 14, whereas the second shielding electrode unit 12 has the plurality of openings 15, and the third shielding electrode unit 13 has the plurality of openings 16. The bias applying power source 4 applies a bias to the multi-level charged-particle shielding-electrode unit 3. The bias applying power source 4 includes the first-bias applying power source 17, the second-bias applying power source 18, and the third-bias applying power source 19.

To manufacture carbon nanotubes, the radical producing apparatus 31 is connected to a growth substrate holding apparatus 32 that is provided separately. The growth substrate holding apparatus 32 has the same structure as the growth substrate holding unit 5. To have various substances form on a surface of a substrate 33 by using a vapor phase growing method, the growth substrate holding apparatus 32 includes the substrate stage 21 including a heating mechanism (not shown). The substrate 33 can be made of any suitable material such as silicon (Si). The substrate 33 has fine particles (or an extremely thin film) of nickel (Ni), iron (Fe), and/or cobalt (Co), which serve as a catalyst, deposited thereon. The substrate 33 is heated to a low temperature within a wide range between, for example, 300° C. and 500° C. The system obtained by connecting the radical producing apparatus 31 and the growth substrate holding apparatus 32 to each other achieves the same functions as those of the carbon nanotube manufacturing apparatus 1 according to the first embodiment. Accordingly, the radical producing apparatus 31 prevents the ions and the electrons from being released into the growth substrate holding apparatus 32 and allows the radicals to be released into the growth substrate holding apparatus 32. As a result, it is possible to manufacture high-quality carbon nanotubes in the growth substrate holding apparatus 32, like when the carbon nanotube manufacturing apparatus 1 is used.

Further, by changing the type of the discharge gas introduced into the radical producing apparatus 31 and changing the material of which the substrate 33 is made, the radical producing apparatus 31 is able to allow the radicals that are used as a raw material for a substance other than carbon nanotubes to be released into the growth substrate holding apparatus 32, so as to produce the substance on the surface of the substrate 33 as an insulating film or a sealing film within the growth substrate holding apparatus 32. For example, the radical producing apparatus 31 is very effective in the production of a substance having a weak structure, such as an organic electroluminescence (EL) element.

Figure 7:
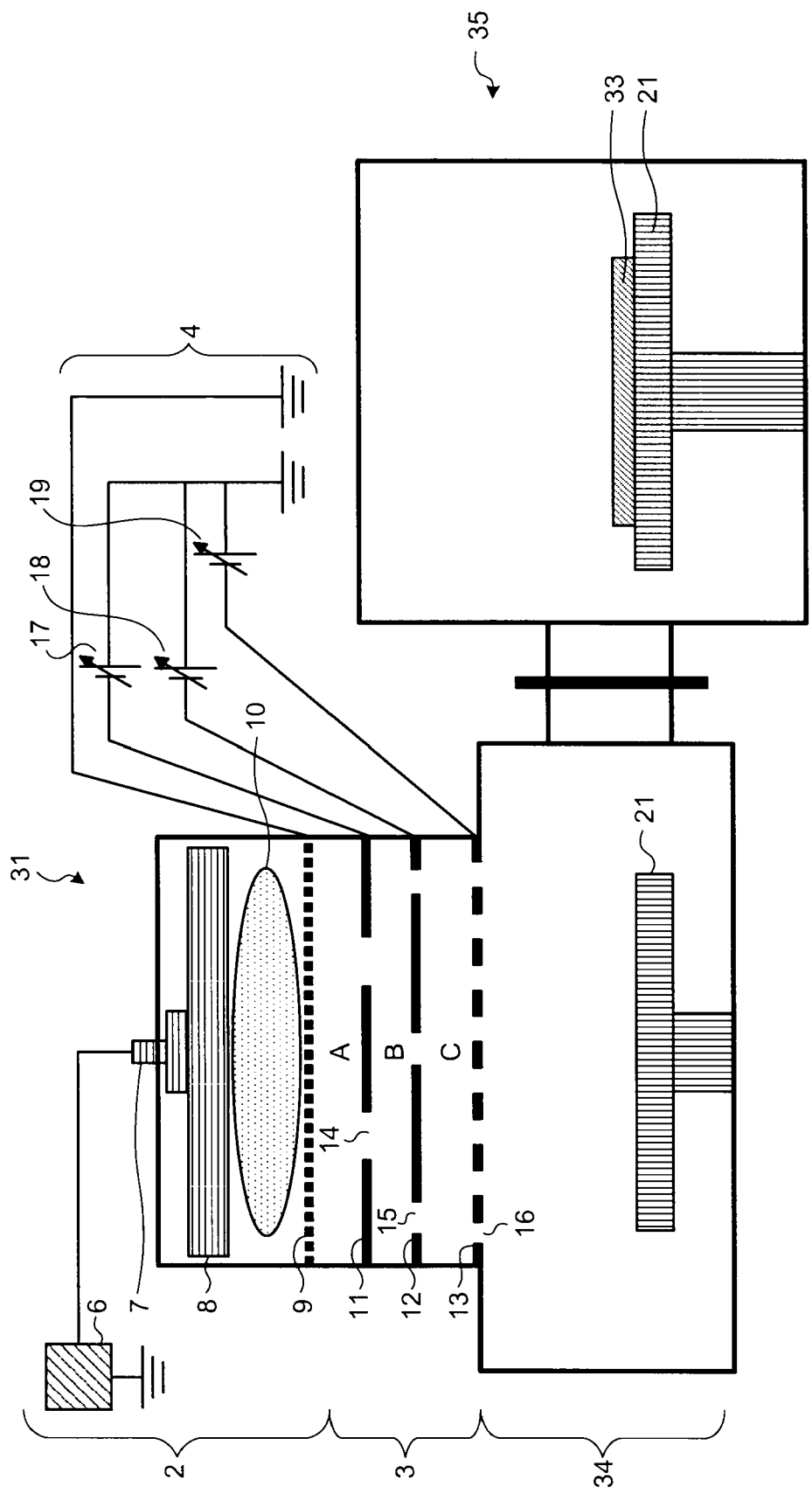
FIG. 7 is a drawing for explaining another exemplary usage of the radical producing apparatus according to the second embodiment.

As another exemplary usage of the radical producing apparatus according to the second embodiment, as shown in FIG. 7, the radical producing apparatus 31 may be connected to a preliminary chamber 34, whereas the preliminary chamber 34 is further connected to a main chamber (hereinafter, the "chamber") 35. The preliminary chamber 34 and the chamber 35 each include the substrate stage 21 and each function as the growth substrate holding apparatus 32. Further, depending on the situation, it is possible to transport the substrate 33 in a vacuum environment, between the substrate stage 21 in the preliminary chamber 34 and the substrate stage 21 in the chamber 35.

As explained above, when the radical producing apparatus according to the second embodiment is used, the shielding electrode units that are respectively positioned on the three levels and are included in the charged-particle shielding electrode unit connected to the plasma generating unit are able to prevent the ions and the electrons from being released to the outside of the radical producing apparatus and to allow the radicals to be released to the outside of the radical producing apparatus, the ions, the radicals, and the electrons being included in the plasma generated by the plasma generating unit. Thus, the radical producing apparatus is able to produce the radicals.

A carbon nanotube manufacturing apparatus according to a third embodiment of the present invention is different from the carbon nanotube manufacturing apparatus according to the first embodiment in the number of shielding electrode units included in the multi-level charged-particle shielding-electrode unit, the configurations of the openings provided in the shielding electrode units, and the distances between the openings. In the following sections, the third embodiment will be explained, with reference to the accompanying drawings. A configuration of the carbon nanotube manufacturing apparatus according to the third embodiment will be explained while a focus is placed on the differences from the first embodiment. Because the other parts of the third embodiment are the same as the first embodiment, as for the elements that are referred to by using the same characters, explanation thereof will be omitted, and the explanation above should be referred to.

Figure 8:
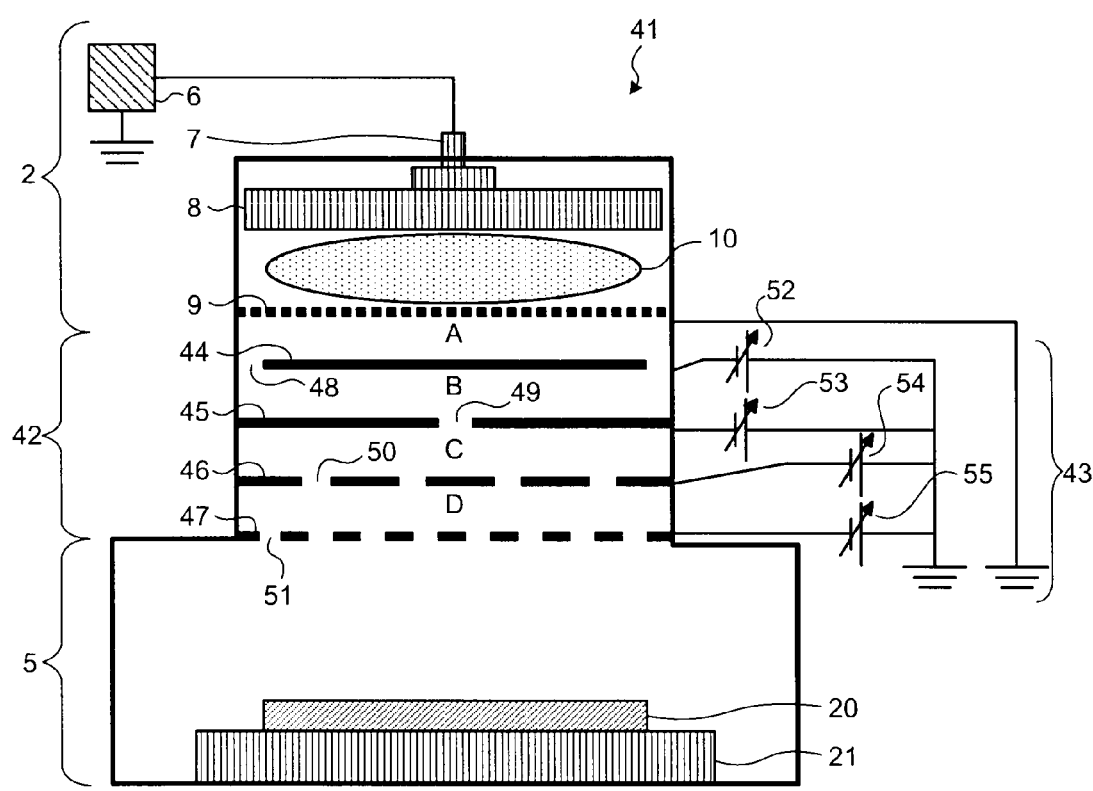
FIG. 8 is a cross-sectional view of a carbon nanotube manufacturing apparatus according to a third embodiment of the present invention.

As shown in FIG. 8, a carbon nanotube manufacturing apparatus 41 manufactures carbon nanotubes on a substrate by using a plasma CVD method. The carbon nanotube manufacturing apparatus 41 includes the plasma generating unit 2, a multi-level charged-particle shielding-electrode unit 42, a bias applying power source 43, and the growth substrate holding unit 5.

The plasma generating unit 2 generates the plasma 10. The plasma generating unit 2 includes the pulse power source 6, the gas inlet 7, the upper electrode 8, and the lower electrode 9.

Of the ions, the radicals, and the electrons that are included in the plasma 10, to block the ions and the electrons, the multi-level charged-particle shielding-electrode unit 42 is provided between the plasma generating unit 2 and the growth substrate holding unit 5. The multi-level charged-particle shielding-electrode unit 42 includes four plate-like shielding electrode units that are respectively positioned on four different levels. More specifically, the multi-level charged-particle shielding-electrode unit 42 includes a first shielding electrode unit 44 positioned on the first level, a second shielding electrode unit 45 positioned on the second level, a third shielding electrode unit 46 positioned on the third level, and a fourth shielding electrode unit 47 positioned on the fourth level. The first shielding electrode unit 44 has a gap 48. The second shielding electrode unit 45 has one opening 49, whereas the third shielding electrode unit 46 has a plurality of openings 50, and the fourth shielding electrode unit 47 has a plurality of openings 51.

Figure 9:
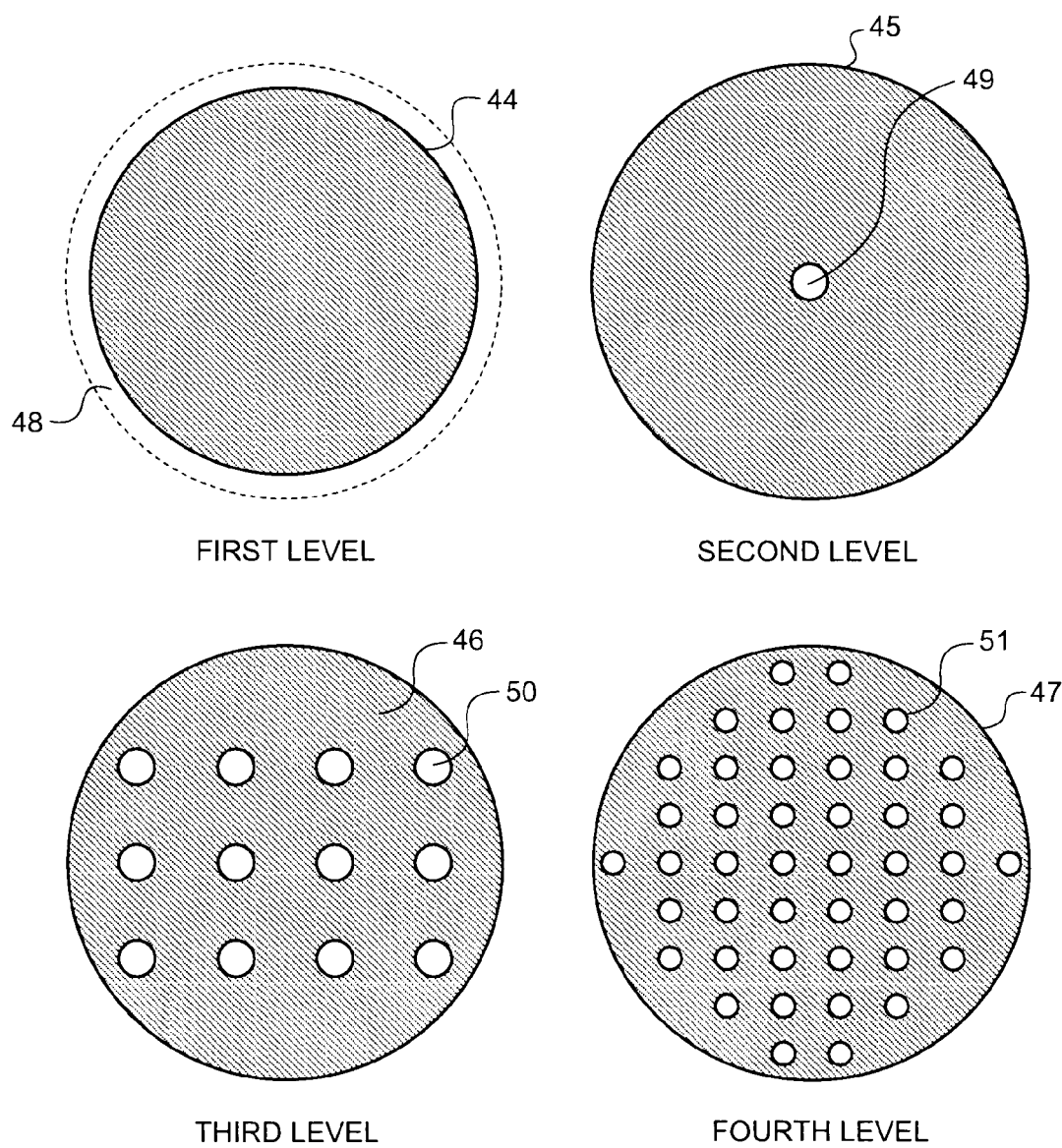
FIG. 9 is a top view of shielding electrode units included in yet another multi-level charged-particle shielding-electrode unit.

As shown in FIG. 9, the first shielding electrode unit 44 is configured so as to be smaller than the size of the outer wall (shown with a dotted line in FIG. 9) of the multi-level charged-particle shielding-electrode unit 42. As a result, the gap 48 is formed between the outer circumference of the first shielding electrode unit 44 and the outer wall of the multi-level charged-particle shielding-electrode unit 42. Further, as shown in FIG. 9, the second shielding electrode unit 45 has the one opening 49 at the center thereof, whereas the third shielding electrode unit 46 has the plurality of openings 50, and the fourth shielding electrode unit 47 has the plurality of openings 51. The width of the gap 48, the opening diameter of the opening 49, and the opening diameter of each of the openings 50 are substantially equal to one another. Only the opening diameter of each of the openings 51 is different from the opening diameter of the other openings and the width of the gap. Further, the number of openings 50 is larger than the number of openings 49, while the number of openings 51 is larger than the number of openings 50.

The bias applying power source 43 is a power source that applies a bias to the multi-level charged-particle shielding-electrode unit 42. In the present example, the bias applying power source 43 applies a negative bias to the multi-level charged-particle shielding-electrode unit 42. The bias applying power source 43 includes a first-bias applying power source 52, a second-bias applying power source 53, a third-bias applying power source 54, and a fourth bias applying power source 55.

The first-bias applying power source 52 is connected to the first shielding electrode unit 44 and applies a voltage to the first shielding electrode unit 44. The second-bias applying power source 53 is connected to the second shielding electrode unit 45 and applies a voltage to the second shielding electrode unit 45. The third-bias applying power source 54 is connected to the third shielding electrode unit 46 and applies a voltage to the third shielding electrode unit 46. The fourth bias applying power source 55 is connected to the fourth shielding electrode unit 47 and applies a voltage to the fourth shielding electrode unit 47. Thus, it is possible to apply mutually different voltages to the first shielding electrode unit 44, the second shielding electrode unit 45, the third shielding electrode unit 46, and the fourth shielding electrode unit 47, respectively. It is preferable to specify each of the voltages applied by the first-bias applying power source 52, the second-bias applying power source 53, the third-bias applying power source 54, and the fourth bias applying power source 55 so as to be within a range between a maximum of hundreds of volts and a minimum of a few or several volts.

The growth substrate holding unit 5 manufactures carbon nanotubes by having carbon nanotubes formed on the surface of the substrate 20 by using a vapor phase growing method. For this purpose, the growth substrate holding unit 5 is configured so as to include the substrate stage 21 that includes a heating mechanism (not shown). The substrate 20 is heated to a low temperature within a wide range between, for example, 300° C. and 500° C.

Next, a method for manufacturing carbon nanotubes that is used by the carbon nanotube manufacturing apparatus 41 according to the third embodiment will be explained. In the following explanation with reference to FIG. 8, the space between the lower electrode 9 and the first shielding electrode unit 44 will be referred to as a space A, whereas the space between the first shielding electrode unit 44 and the second shielding electrode unit 45 will be referred to as a space B, and the space between the second shielding electrode unit 45 and the third shielding electrode unit 46 will be referred to as a space C, while the space between the third shielding electrode unit 46 and the fourth shielding electrode unit 47 will be referred to as a space D.

First, when a pulse voltage from the pulse power source 6 is applied to the upper electrode 8, so that the discharge gas is released through the large number of holes provided in the upper electrode 8, the plasma 10 is generated between the upper electrode 8 and the lower electrode 9. The plasma 10 that has been generated is forwarded into the space A within the multi-level charged-particle shielding-electrode unit 42 through the holes (i.e., the openings) in the mesh of the lower electrode 9, while following a flow of the exhaust from an exhaust unit (not shown) provided in the carbon nanotube manufacturing apparatus 41 or a flow due to the gravity. Also, in the space A, ions and radicals are secondarily generated due to the excitation accelerating effect of the excited argon atoms that have been generated in the plasma 10. In the present example, a negative bias is applied to each of the shielding electrode units included in the multi-level charged-particle shielding-electrode unit 42 by the bias applying power source 43.

As a result, because the first shielding electrode unit 44 functions as an absorbing plate for the ions, a large part of the ions that are present in the space A are attracted to the first shielding electrode unit 44 due to an attractive force thereof and vanish when colliding with the first shielding electrode unit 44. However, a small quantity of ions are accelerated by the negative bias, go through the gap 48, and reach the space B.

Also, because the first shielding electrode unit 44 functions as a reflecting plate for the electrons, the electrons that are present in the space A are confined to the space A due to a repulsion force of the first shielding electrode unit 44. As for the radicals that are present in the space A, because the radicals are electrically neutral and are not influenced by the negative bias applied to the first shielding electrode unit 44, the radicals go through the gap 48 and reach the space B while following the flow. As a result, almost all the radicals and the small quantity of ions reach the space B from the space A.

In the space B, in addition to the radicals and the small quantity of ions that have moved from the space A, more ions and radicals are secondarily generated due to the excitation accelerating effect of the excited argon atoms that have been generated in the plasma 10. Further, a small quantity of ions and a small quantity of electrons are newly generated because of decomposition and excitation of the discharge gas that are caused by the ions accelerated in the space B.

Further, because the second shielding electrode unit 45 functions as an absorbing plate for the ions, the small quantity of ions that are present in the space B are attracted to the second shielding electrode unit 45 due to an attractive force thereof, so that almost all of the small quantity of ions vanish when colliding with the second shielding electrode unit 45.

At this time, to prevent the situation where the ions accelerated by the negative bias go through the opening 49 without colliding with the second shielding electrode unit 45, it is necessary to configure the opening 49 so as to be positioned distant from the gap 48 by a predetermined length. In the present example, the relationships expressed in Expression (1) explained in the description of the first embodiment are satisfied. Further, the opening 49 is positioned much more distant from the gap 48 than in the example where the openings 14 are positioned distant from the openings 15 in the carbon nanotube manufacturing apparatus 1 according to the first embodiment. As a result, the quantity of ions that go through the opening 49 and reach the space C is much smaller than the quantity of those in the carbon nanotube manufacturing apparatus 1.

Further, because the second shielding electrode unit 45 functions as a reflecting plate for the electrons, the electrons that are present in the space B are confined to the space B due to a repulsion force of the second shielding electrode unit 45. As for the radicals that are present in the space B, because the radicals are electrically neutral and are not influenced by the negative bias applied to the second shielding electrode unit 45, the radicals go through the opening 49 and reach the space C while following the flow.

In the space C, in addition to the radicals that have moved from the space B, ions and more radicals are secondarily generated due to the excitation accelerating effect of the excited argon atoms that have been generated in the plasma 10.

Further, because the third shielding electrode unit 46 functions as an absorbing plate for the ions, the small quantity of ions that are present in the space C are attracted to the third shielding electrode unit 46 due to an attractive force thereof, and almost all of the small quantity of ions vanish when colliding with the third shielding electrode unit 46. In this situation, an arrangement is acceptable in which the openings 50 provided in the third shielding electrode unit 46 are positioned in such a manner that the relationships expressed in Expression (1) explained in the description of the first embodiment are satisfied. However, because the quantity of ions that are present in the space C is small, another arrangement is also acceptable in which the openings 50 are positioned on the assumption that the angle of incidence of the ions is larger than 45 degrees (i.e., by configuring the intervals between the openings so as to be shorter). With either of these two arrangements, it is possible to cause the predetermined quantity of the ions that are present in the space C to vanish due to the collisions with the third shielding electrode unit 46 and to confine the electrons that are present in the space C to the space C by using the third shielding electrode unit 46.

Further, because the third shielding electrode unit 46 functions as a reflecting plate for the electrons, the electrons that are present in the space C are confined to the space C because of a repulsion force of the third shielding electrode unit 46. As for the radicals that are present in the space C, because the radicals are electrically neutral and are not influenced by the negative bias applied to the third shielding electrode unit 46, the radicals go through the openings 50 and reach the space D while following the flow.

In the space D, in addition to the radicals that have moved from the space C, ions and more radicals are secondarily generated due to the excitation accelerating effect of the excited argon atoms that have been generated in the plasma 10.

Because the large number of openings 51 are provided in the fourth shielding electrode unit 47, Expression (1) explained in the description of the first embodiment does not apply to the design of the positions of the openings 51; however, it is possible to cause a predetermined quantity of the ions that are present in the space D to vanish due to collisions with the fourth shielding electrode unit 47 and to confine the electrons that are present in the space D to the space D by using the fourth shielding electrode unit 47. Accordingly, as for the fourth shielding electrode unit 47 positioned on the fourth level, it is more realistic to assume the angle of incidence of the ions to be an angle larger than 45 degrees (i.e., to configure the intervals between the openings so as to be shorter) because it is possible to supply a sufficient quantity of radicals to the growth substrate holding unit 5 by a shower effect.

Because of the fourth shielding electrode unit 47, the ions in the space D vanish, and the electrons that are present in the space D are confined to the space D. However, because the radicals that are present in the space D are electrically neutral and are not influenced by the negative bias applied to the fourth shielding electrode unit 47, the radicals go through the openings 51 and reach the growth substrate holding unit 5 while following the flow.

In the present example, each of the openings 51 is smaller than each of the openings 50. Also, the openings 49, 50, and 51 are configured so that the distribution density thereof becomes higher from the upper level to the lower level. Thus, it is possible to obtain a uniform radical flow in the growth substrate holding unit 5. By using the radicals that have reached the growth substrate holding unit 5 as a raw material, it is possible to manufacture carbon nanotubes on the surface of the substrate 20.

As explained above, by configuring the multi-level charged-particle shielding-electrode unit 42 so as to include more shielding electrode units respectively positioned on more levels than in the example according to the first embodiment and by designing the structure so that the gap 48 of the first shielding electrode unit 44 is more distant from the opening 49 provided in the second shielding electrode unit 45 than in the example according to the first embodiment, it is possible to further enhance the level of efficiency for eliminating the ions and the electrons, compared to the example according to the first embodiment.

In addition, the plasma generating unit 2 and the growth substrate holding unit 5 are separated from each other by the multi-level charged-particle shielding-electrode unit 42. The pressure in the growth substrate holding unit 5 is lower than the pressure in the plasma generating unit 2. By regulating the pressure in the plasma generating unit 2, it is possible to keep the decrease in the quantity of radical components in the growth substrate holding unit 5 minimum, the decrease being caused by the collisions of the radical components with the discharge gas.

Also, as explained above, the bias voltage applied to the multi-level charged-particle shielding-electrode unit 42 is configured so as to be within a range between a maximum of hundreds of volts and a minimum of a few or several volts. The values of the voltages that are applied to the shielding electrode units are configured so that the voltage applied to the second shielding electrode unit 45 is lower than the voltage applied to the first shielding electrode unit 44, so that the voltage applied to the third shielding electrode unit 46 is lower than the voltage applied to the second shielding electrode unit 45, and so that the voltage applied to the fourth shielding electrode unit 47 is lower than the voltage applied to the third shielding electrode unit 46. The reason is that, by gradually lowering the applied bias from the first level to the fourth level, it is possible to keep the decomposition and the excitation of the gas caused by the ions and the electrons at a minimum level, because the energy that is given to the ions or the electrons due to the biases gradually becomes smaller. As explained here, it is possible to achieve a high level of efficiency for eliminating the ions and the electrons by designing the shielding electrode units included in the multi-level charged-particle shielding-electrode unit 42 so as to have a multi-level structure.

Further, because the multi-level charged-particle shielding-electrode unit 42 includes the plurality of shielding electrode units (i.e., the shielding electrode units 44, 45, 46 and 47) and because the travelling distance of the radicals to reach the growth substrate holding unit 5 is long due to the positional arrangements where the gap 48 and the opening 49 are positioned distant from each other and where the opening 49 and the openings 50 are positioned distant from each other, a problem remains where the quantity of radicals, which are required for the generation of the carbon nanotubes, decreases because of the radicals' collisions with the discharge gas or the like. However, with the excitation acceleration effect of the excited argon atoms that have been generated in the plasma 10, it is possible to secondarily generate ions and radicals and to replenish radicals the quantity of which has decreased. Because the excited argon atoms are in a metastable state and have an extremely long life span, it is possible to generate ions, radicals, and electrons with a high level of efficiency, also in the multi-level charged-particle shielding-electrode unit 42. In addition, because the ions and the electrons that are generated at the same time with the radicals are eliminated or captured by the shielding electrode units 44, 45, 46, and 47, the ions and the electrons do not move to the next space underneath. Consequently, it is possible to supply a sufficient quantity of radicals to the growth substrate holding unit 5.

As explained above, it is possible to realize both the elimination of the ion components and the electrons and the supply of the required quantity of pure radical components, by regulating the configurations of the gaps, the configurations and the distributions of the openings provided in the shielding electrode units 44, 45, 46, and 47 included in the multi-level charged-particle shielding-electrode unit 42, the distances between the shielding electrode units 44, 45, 46, and 47, the voltages applied to the shielding electrode units 44, 45, 46, and 47, and the pressures in the plasma generating unit 2 and the growth substrate holding unit 5. Consequently, it is possible to manufacture high-quality carbon nanotubes in a wide range of temperatures, especially at a low temperature. As a result, it is possible to manufacture carbon nanotubes on a material of which the heat resistance temperature is low. The carbon nanotubes are therefore expected to be used in a wide range of applications.

According to the third embodiment, the bias applying power source 43 applies the negative bias to the multi-level charged-particle shielding-electrode unit 42; however, it is possible to eliminate the ions and the electrons even if the bias applying power source 43 applies a positive bias. In this situation, the first shielding electrode unit 44, the second shielding electrode unit 45, the third shielding electrode unit 46, and the fourth shielding electrode unit 47 each function as a reflecting plate for the ions and as an absorbing plate for the electrons. However, because the ions have a larger mass and thus have a higher tendency of travelling linearly and because the ions have a larger scattering cross-section area, it is preferable to apply a negative bias to the multi-level charged-particle shielding-electrode unit 42 and to have the ions drawn into the shielding electrode units.

Further, according to the third embodiment, the discharge gas is the mixed gas in which the carbon-based gas, hydrogen, and the noble gas are mixed together in an appropriate proportion. However, another arrangement is acceptable in which a mixed gas in which only a carbon-based gas and hydrogen are mixed together in an appropriate proportion is used. In this situation, it is not possible to re-generate radicals from the noble gas. However, there will be no problem if only a small quantity of radicals is required.

As explained above, when the carbon nanotube manufacturing apparatus according to the third embodiment is used, the shielding electrode units that are respectively positioned on the four levels and are included in the charged-particle shielding electrode unit provided between the plasma generating unit and the growth substrate holding unit are able to prevent the ions and the electrons from entering the growth substrate holding unit and to allow the radicals to move into the growth substrate holding unit, the ions, the radicals, and the electrons being included in the plasma generated by the plasma generating unit. Thus, it is possible to manufacture high-quality carbon nanotubes by using the radicals as a raw material, in a wide range of temperatures, especially at a low temperature.

In a carbon nanotube manufacturing apparatus according to a fourth embodiment of the present invention, only one electrode unit is included in a charged-particle shielding electrode unit, but a box-shaped shielding electrode unit is provided so as to cover the substrate stage included in the growth substrate holding unit. In the following sections, the fourth embodiment will be explained with reference to the accompanying drawings. A configuration of the carbon nanotube manufacturing apparatus according to the fourth embodiment will be explained while a focus is placed on the differences from the first embodiment. Because the other parts of the fourth embodiment are the same as the first embodiment, as for the elements that are referred to by using the same characters, explanation thereof will be omitted, and the explanation above should be referred to.

Figures 10, 11:
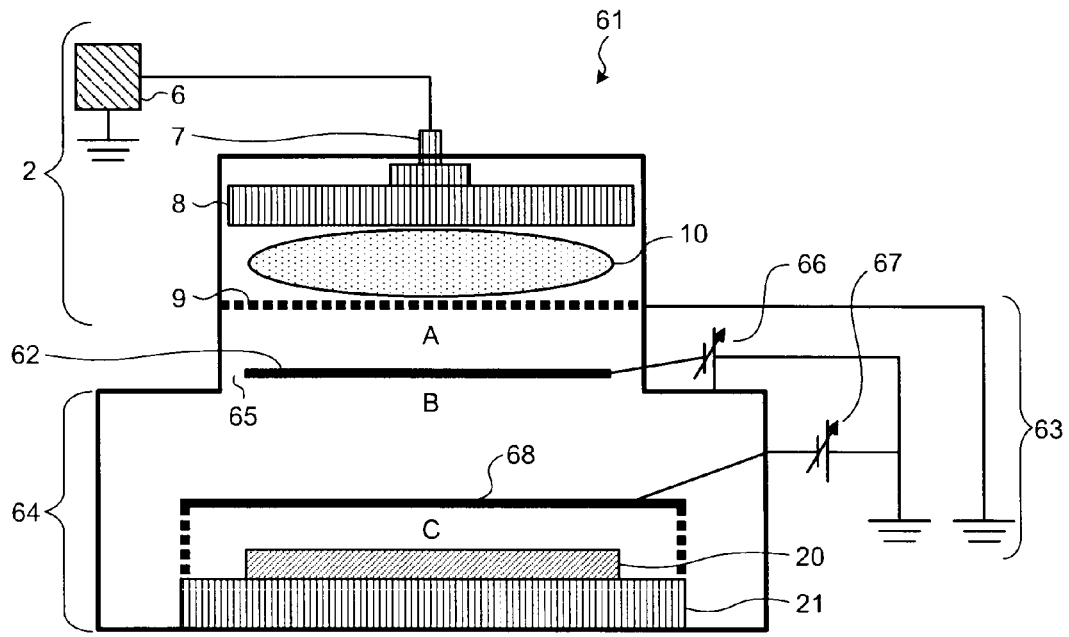
FIG. 10 is a cross-sectional view of a carbon nanotube manufacturing apparatus according to a fourth embodiment of the present invention.
FIG. 11 is a top view of a charged-particle shielding electrode unit and a box-shaped shielding electrode unit.

As shown in FIG. 10, a carbon nanotube manufacturing apparatus 61 manufactures carbon nanotubes on a substrate by using a plasma CVD method. The carbon nanotube manufacturing apparatus 61 includes the plasma generating unit 2, a charged-particle shielding electrode unit 62, a bias applying power source 63, and a growth substrate holding unit 64.

The plasma generating unit 2 generates the plasma 10. The plasma generating unit 2 includes the pulse power source 6, the gas inlet 7, the upper electrode 8, and the lower electrode 9.

Of the ions, the radicals, and the electrons that are included in the plasma 10, to block the ions and the electrons, the charged-particle shielding electrode unit 62 is provided between the plasma generating unit 2 and the growth substrate holding unit 64. The charged-particle shielding electrode unit 62 includes only one plate-like shielding electrode unit positioned on one level. Also, the charged-particle shielding electrode unit 62 is configured so as to have a gap 65.

The bias applying power source 63 is a power source that applies a bias to the charged-particle shielding electrode unit 62 and a box-shaped shielding electrode unit 68, which is explained later. In the present example, the bias applying power source 63 applies a negative bias to the charged-particle shielding electrode unit 62 and the box-shaped shielding electrode unit 68. The bias applying power source 63 includes a first-bias applying power source 66 and a second-bias applying power source 67.

The first-bias applying power source 66 is connected to the charged-particle shielding electrode unit 62 and applies a voltage to the charged-particle shielding electrode unit 62. The second-bias applying power source 67 is connected to the box-shaped shielding electrode unit 68 and applies a voltage to the box-shaped shielding electrode unit 68. Thus, it is possible to apply mutually different voltages to the charged-particle shielding electrode unit 62 and the box-shaped shielding electrode unit 68, respectively. It is preferable to specify each of the voltages applied by the first-bias applying power source 66 and the second-bias applying power source 67 so as to be within a range between a maximum of hundreds of volts and a minimum of a few or several volts.

The growth substrate holding unit 64 manufactures carbon nanotubes by having carbon nanotubes formed on the surface of the substrate 20 by using a vapor phase growing method. The growth substrate holding unit 64 includes the substrate stage 21 including a heating mechanism (not shown) and the box-shaped shielding electrode unit 68. The substrate 20 is heated to a low temperature within a wide range between, for example, 300° C. and 500° C. Of the ions, the radicals, and the electrons that are included in the plasma 10, to block the ions and the electrons, the box-shaped shielding electrode unit 68 is disposed so as to cover the substrate stage 21. The upper face of the box-shaped shielding electrode unit 68 is plate-like and is completely closed. Each of the lateral faces of the box-shaped shielding electrode unit 68 is configured so as to be in the form of a mesh (i.e., a grid).

As shown in FIG. 11, the charged-particle shielding electrode unit 62 is configured so as to be smaller than the size of the outer wall (shown with a dotted line in FIG. 11) of the charged-particle shielding electrode unit 62. As a result, the gap 65 is formed between the outer circumference and the outer wall of the charged-particle shielding electrode unit 62. Further, as shown in FIG. 11, the box-shaped shielding electrode unit 68 is sufficiently larger than the charged-particle shielding electrode unit 62.

<A Method for Manufacturing Carbon Nanotubes>

Next, a method for manufacturing carbon nanotubes that is used by the carbon nanotube manufacturing apparatus 61 according to the fourth embodiment will be explained. In the following explanation with reference to FIG. 10, the space between the lower electrode 9 and the charged-particle shielding electrode unit 62 will be referred to as a space A, whereas the space between the charged-particle shielding electrode unit 62 and the box-shaped shielding electrode unit 68 will be referred to as a space B, and the space inside the box-shaped shielding electrode unit 68 will be referred to as a space C.

First, when a pulse voltage from the pulse power source 6 is applied to the upper electrode 8, so that the discharge gas is released through the large number of holes provided in the upper electrode 8, the plasma 10 is generated between the upper electrode 8 and the lower electrode 9. The plasma 10 that has been generated is forwarded into the space A within the charged-particle shielding electrode unit 62 through the holes (i.e., the openings) in the mesh of the lower electrode 9, while following a flow of the exhaust from an exhaust unit (not shown) provided in the carbon nanotube manufacturing apparatus 61 or a flow due to the gravity. Also, in the space A, ions and radicals are secondarily generated due to the excitation accelerating effect of the excited argon atoms that have been generated in the plasma 10. In the present example, a negative bias is applied to the charged-particle shielding electrode unit 62 by the first-bias applying power source 66.

As a result, because the charged-particle shielding electrode unit 62 functions as an absorbing plate for the ions, a large part of the ions that are present in the space A are attracted to the charged-particle shielding electrode unit 62 due to an attractive force thereof and vanish when colliding with the charged-particle shielding electrode unit 62. However, a small quantity of ions are accelerated by the negative bias, go through the gap 65, and reach the space B.

Also, because the charged-particle shielding electrode unit 62 functions as a reflecting plate for the electrons, the electrons that are present in the space A are confined to the space A due to a repulsion force of the charged-particle shielding electrode unit 62. As for the radicals that are present in the space A, because the radicals are electrically neutral and are not influenced by the negative bias applied to the charged-particle shielding electrode unit 62, the radicals go through the gap 65 and reach the space B while following the flow. As a result, almost all the radicals and the small quantity of ions reach the space B from the space A.

In addition, because the box-shaped shielding electrode unit 68 functions as an absorbing plate for the ions, the small quantity of ions that have reached the space B are attracted to the box-shaped shielding electrode unit 68 due to an attractive force thereof, and almost all of the small quantity of ions vanish when colliding with the upper face of the box-shaped shielding electrode unit 68. Further, even if some electrons are present in the space B for some reason, because the box-shaped shielding electrode unit 68 functions as a reflecting plate for the electrons, the electrons are confined to the space B due to a repulsion force of the box-shaped shielding electrode unit 68 and do not enter the space C.

As for the radicals that are present in the space B, because the radicals are electrically neutral and are not influenced by the negative bias applied to the box-shaped shielding electrode unit 68, the radicals go through the lateral faces of the box-shaped shielding electrode unit 68 each of which is configured so as to be in the form of a mesh (i.e., a grid) and reach the space C while following the flow. Thus, carbon nanotubes are manufactured on the surface of the substrate while using the radicals as a raw material.

As explained above, because the charged-particle shielding electrode unit 62 is configured so as to include only the one shielding electrode unit positioned on one level, the traveling distance of the radicals to reach the growth substrate holding unit 64 is shorter, and also, the decrease in the quantity of radicals is small. Thus, it is possible to supply a sufficient quantity of radicals without using the excitation acceleration effect of the noble gas. Further, because the upper face of the box-shaped shielding electrode unit 68 is configured so as to be sufficiently larger than the charged-particle shielding electrode unit 62, it is possible to eliminate the ions that have entered from the charged-particle shielding electrode unit 62 and travel toward the substrate 20 by causing the ions to collide with the upper face of the box-shaped shielding electrode unit 68.

In addition, the plasma generating unit 2 and the growth substrate holding unit 64 are separated from each other by the charged-particle shielding electrode unit 62. The pressure in the growth substrate holding unit 64 is lower than the pressure in the plasma generating unit 2. By regulating the pressure in the plasma generating unit 2, it is possible to keep the decrease in the quantity of radical components in the growth substrate holding unit 64 minimum, the decrease being caused by the collisions of the radical components with the discharge gas.

Also, as explained above, each of the bias voltages applied to the charged-particle shielding electrode unit 62 and the box-shaped shielding electrode unit 68 is configured so as to be within a range between a maximum of hundreds of volts and a minimum of a few or several volts. The voltage applied to the box-shaped shielding electrode unit 68 is configured so as to be lower than the voltage applied to the charged-particle shielding electrode unit 62. The reason is that, by lowering the applied bias, it is possible to keep the decomposition and the excitation of the gas caused by the ions and the electrons at a minimum level, because the energy that is given to the ions or the electrons due to the biases becomes smaller. As a result, it is possible to achieve a high level of efficiency for eliminating the ions and the electrons.

As explained above, it is possible to realize both the elimination of the ion components and the electrons and the supply of the required quantity of pure radical components, by regulating the configuration of the gap of the charged-particle shielding electrode unit 62, the configuration of the charged-particle shielding electrode unit 62, the distance between the charged-particle shielding electrode unit 62 and the box-shaped shielding electrode unit 68, the voltages applied to the charged-particle shielding electrode unit 62 and the box-shaped shielding electrode unit 68, and the pressures in the plasma generating unit 2 and the growth substrate holding unit 64. Consequently, it is possible to manufacture high-quality carbon nanotubes in a wide range of temperatures, especially at a low temperature. As a result, it is possible to manufacture carbon nanotubes on a material of which the heat resistance temperature is low. The carbon nanotubes are therefore expected to be used in a wide range of applications.

According to the fourth embodiment, the bias applying power source 63 applies the negative bias to the charged-particle shielding electrode unit 62 and the box-shaped shielding electrode unit 68; however, it is possible to eliminate the ions and the electrons even if the bias applying power source 63 applies a positive bias. In this situation, the charged-particle shielding electrode unit 62 and the box-shaped shielding electrode unit 68 each function as a reflecting plate for the ions and as an absorbing plate for the electrons. However, because the ions have a larger mass and thus have a higher tendency of travelling linearly and because the ions have a larger scattering cross-section area, it is preferable to apply a negative bias to the charged-particle shielding electrode unit 62 and the box-shaped shielding electrode unit 68 and to have the ions drawn into the charged-particle shielding electrode unit 62 and the box-shaped shielding electrode unit 68.

As explained above, when the carbon nanotube manufacturing apparatus according to the fourth embodiment is used, the shielding electrode unit that is positioned on the one level and is included in the charged-particle shielding electrode unit provided between the plasma generating unit and the growth substrate holding unit as well as the box-shaped shielding electrode unit provided in the growth substrate holding unit are able to prevent the ions and the electrons from entering the box-shaped shielding electrode unit and to allow the radicals to move into the box-shaped shielding electrode unit, the ions, the radicals, and the electrons being included in the plasma generated by the plasma generating unit. Thus, it is possible to manufacture high-quality carbon nanotubes by using the radicals as a raw material, in a wide range of temperatures, especially at a low temperature.

The present invention is useful in a semiconductor apparatus that uses carbon nanotubes manufactured at a low temperature as wiring.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon nanotube manufacturing apparatus comprising:
    a plasma generating unit that generates plasma including ions, radicals, and electrons, from gas;
    a carbon nanotube manufacturing unit that manufactures carbon nanotubes from the radicals;
    a shielding electrode unit that is provided between the plasma generating unit and the carbon nanotube manufacturing unit and prevents the ions and the electrons from entering the carbon nanotube manufacturing unit; and
    a bias applying unit that applies a voltage to the shielding electrode unit, wherein
    the shielding electrode unit includes at least two first shielding electrodes that are arranged one above another, each of the first shielding electrodes having at least one opening, wherein openings that are respectively provided in the first shielding electrodes positioned adjacent to each other are positioned to be laterally displaced from each other without overlap to prevent the ions or the electrons from going through both of the openings.

2. The apparatus according to claim 1, wherein
    the carbon nanotube manufacturing unit includes a second shielding electrode that prevents the ions and the electrons from entering inside thereof,
    an upper face of the second shielding electrode is configured to be plate-shaped and each of lateral faces of the second shielding electrode is configured to be a mesh, and
    the bias applying unit applies a voltage to the second shielding electrode.

3. The apparatus according to claim 1, wherein the gas is a carbon-based gas diluted with a noble gas.

4. The apparatus according to claim 1, wherein density of the plasma generated by the plasma generating unit is $10^{10}$ $cm^{-3}$ or lower.

5. The apparatus according to claim 1, wherein a pressure in the plasma generating unit is higher than a pressure in the carbon nanotube manufacturing unit.

6. The apparatus according to claim 1, wherein the bias applying unit applies a negative voltage.

7. A carbon nanotube manufacturing method comprising:
    generating plasma including ions, radicals, and electrons, from gas;
    applying a voltage to a shielding electrode unit that includes at least two shielding electrodes that are arranged one above another, each of the shielding electrodes having at least one opening;
    preventing the ions and the electrons from entering a carbon nanotube manufacturing unit that manufactures carbon nanotubes from the radicals, and allowing the radicals to enter the carbon nanotube manufacturing unit, including positioning openings that are respectively provided in the shielding electrodes adjacent to each other to be laterally displaced from each other without overlap to prevent the ions or the electrons from going through both of the openings; and
    manufacturing the carbon nanotubes from the radicals.

* * * * *